US010158608B2

(12) United States Patent
Selander

(10) Patent No.: US 10,158,608 B2
(45) Date of Patent: Dec. 18, 2018

(54) KEY ESTABLISHMENT FOR CONSTRAINED RESOURCE DEVICES

(71) Applicant: TELEFONAKTIEBOLAGET L M ERICSSON (PUBL), Stockholm (SE)

(72) Inventor: Göran Selander, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/902,296

(22) PCT Filed: Jul. 2, 2013

(86) PCT No.: PCT/SE2013/050846
§ 371 (c)(1),
(2) Date: Dec. 30, 2015

(87) PCT Pub. No.: WO2015/002581
PCT Pub. Date: Jan. 8, 2015

(65) Prior Publication Data
US 2016/0149869 A1    May 26, 2016

(51) Int. Cl.
*H04L 29/06* (2006.01)
*H04W 12/04* (2009.01)
(Continued)

(52) U.S. Cl.
CPC ............ *H04L 63/0428* (2013.01); *H04L 9/14* (2013.01); *H04L 9/3247* (2013.01);
(Continued)

(58) Field of Classification Search
None
See application file for complete search history.

(56) References Cited

U.S. PATENT DOCUMENTS 6,826,690 B1 * 11/2004 Hind .................. G06F 21/31
                                                    713/173
8,719,952 B1 * 5/2014 Damm-Goossens ...................
                                                    H04L 9/0825
                                                    380/285
(Continued)

OTHER PUBLICATIONS

Gehrmann et al. "Authorization Framework for the Internet-of-Things" IEEE 14th International Symposium and Workshops, 2013, 6 pages.*

(Continued)

*Primary Examiner* — Trang T Doan
(74) *Attorney, Agent, or Firm* — Rothwell, Figg, Ernst & Manbeck, p.c.

(57) ABSTRACT

It is disclosed a method and a constrained resource device (502, 70, 90) for establishing a secret first key between a client device (506) and the constrained resource device. The invention also relates to a method and an authorization server (504, 60, 80) for enabling establishing a secret first key between a client device (506) and the constrained resource device. Based on a secret second key shared (508) between the constrained RD and the AS, the secret first key shared between the constrained resource device and the client device can be established. Devices having constrained resources cannot use protocols with which additional messages are required to share a secure identity. Embodiments of the present invention have the advantage that a secret identity can be established within an authentication protocol and that no additional messages are required to establish the secret identity.

20 Claims, 5 Drawing Sheets

(51) Int. Cl.
| | |
|---|---|
| *H04L 29/08* | (2006.01) |
| *H04L 9/14* | (2006.01) |
| *H04L 9/32* | (2006.01) |
| *H04W 4/70* | (2018.01) |
| *H04W 76/14* | (2018.01) |

(52) U.S. Cl.
CPC ........ *H04L 63/0435* (2013.01); *H04L 63/062* (2013.01); *H04L 67/12* (2013.01); *H04W 4/70* (2018.02); *H04W 12/04* (2013.01); *H04L 2209/24* (2013.01); *H04L 2209/72* (2013.01); *H04L 2463/061* (2013.01); *H04W 76/14* (2018.02)

(56) References Cited

U.S. PATENT DOCUMENTS

| | | |
|---|---|---|
| 2006/0010324 A1 | 1/2006 | Appenzeller et al. |
| 2010/0135498 A1 | 6/2010 | Long et al. |
| 2010/0217990 A1* | 8/2010 | Abe ............... H04L 45/00 713/176 |

OTHER PUBLICATIONS

Garcia-Morchon, O. et al., "Securing the IP-based Internet of Things with HIP and DTLS," Philips Research Europe, WiSec '13, Apr. 17-19, 2013, 119-124.

Keoh, S. et al., "Securing the IP-based Internet of Things with DTLS," LWIG Working Group, Philips Research, Feb. 25, 2013, 20 pages.

Supplementary European Search Report issued in EP 13 88 8912.6 dated May 20, 2016, 9 pages.

Notice of Reasons for Rejection issued in corresponding application No. JP 2016-523695 dated Nov. 8, 2016, 6 pages.

Bonetto et al., "Secure Communication for Smart IoT Objects: Protocol Stacks, Use Cases and Practical Examples", IEEE International Symposium on a World of Wireless, Mobile and Multimedia Networks, Jun. 2012, 8 pages.

Desmedt, Y. and Quisquater, J.-J., Public-Key Systems Based on the Difficulty of Tampering, Lecture Notes in Computer Science, 1987, JICST received, p. 111-117.

European Communication dated Apr. 12, 2018 issued in European Patent Application No. 13 888 912.6. (6 pages).

European Communication dated Aug. 29, 2017 issued in European Patent Application No. 13 888 912.6. (6 pages).

International Search Report dated Apr. 30, 2014, in International Application No. PCT/SE2013/050846, 4 pages.

International Preliminary Examination Report on Patentability dated Nov. 4, 2015, in International Application No. PCT/SE2013/050846, 15 pages.

Seitz et al. "Authorization Framework for the Internet-of-Things" IEEE 14th International Symposium and Workshops, 2013, 6 pages.

Shelby et al. "Constrained Application Protocol (CoAP), draft-ietf-core-coap-16" CoRe Working Group, 2013, 117 pages.

Roman et al. "On the features and challenges of security and privacy in distributed internet of things" Computer Networks, 2013, vol. 57, pp. 2266-2279.

Kothmayr et al. "A DTLS Based End-To-End Security Architecture for the Internet of Things with Two-Way Authentication", 7th IEEE International Workshop on Practical Issues in Building Sensor Network Applications, 2012, 8 pages.

* cited by examiner

KEY ESTABLISHMENT FOR CONSTRAINED RESOURCE DEVICES

CROSS REFERENCE TO RELATED APPLICATION(S)

This application is a 35 U.S.C. § 371 National Phase Entry Application from PCT/SE2013/050846, filed Jul. 2, 2013, designating the United States, the disclosure of which is incorporated herein in its entirety by reference.

TECHNICAL FIELD

This disclosure relates to key establishment for constrained resource devices. In more particular, it relates to a method and a constrained resource device for establishing a secret key between a client device and the constrained resource device. The disclosure also relates to a method and an authorization server for enabling establishment of a secret key between the client device and the constrained resource device.

BACKGROUND

Internet of Things (IoT) is a term commonly used today to refer to a current information technology trend towards a networked society, wherein anything that can benefit from a connection will be connected using Internet protocols. This means that in contrast to the past where mainly mobile phones and computers were globally interconnected over the Internet, now all kinds of electronic equipment are about to come online. This trend is expected to accelerate over the coming years due to the decrease of hardware and network costs as well as the Internet technology maturity.

A central property of IoT devices is that these devices have an Internet protocol (IP) address and are connected to the Internet. Moreover, these devices are often resource constrained, for instance due to slow central processing units or due to a limited energy source of the device. Common protocols by the Internet Engineering Task Force (IETF) for request/response, such as for example HyperText Transfer Protocol (HTTP), are considered to be inefficient or even too complex to handle for simple IoT devices.

Hence, to limit the processing and power consumption, new Internet standards are emerging. IETF is working with defining a new light weight application protocol for Representation State Transfer (REST)-ful message exchange, named Constrained Application Protocol (CoAP), which is based on User Datagram Protocol (UDP) to avoid the need to set up and keep the Transmission Control Protocol (TCP) state. In short, RESTful is a software architecture for distributed systems, such as the World Wide Web (WWW), in which a uniform interface separates clients from stateless servers.

Although CoAP is much more efficient than HTTP, to limit energy consumption, it is important to minimize unnecessary processing and, in particular, unnecessary message exchange. It is known that the energy consumption for message transmission and reception of wireless devices is one or more magnitudes higher than typical cryptographic operations of a corresponding message.

For CoAP, Datagram Transport Layer Security (DTLS) protocol may be used for protocol security. The DTLS protocol provides communication security to datagram protocols, such as User Datagram Protocol (UDP) and is similar to the Transport Layer Security (TLS) protocol used with connection oriented protocols, such as Transmission Control Protocol (TCP).

The TLS protocol is divided into a handshake protocol phase and a record protocol phase. The handshake protocol phase performs authentication and establishes a security context, whereas the record protocol phase protects the payload using the established security context. The TLS handshake protocol typically comprises a 4-pass message exchange.

FIG. 1 schematically presents a TLS protocol between a client 102 and a server 104. In 106, the client sends a Client hello message to the server. In 108, the server responds and sends a Server hello message. In 110, a client certificate, key exchange, is sent to the server. If the server 104 trusts the client, security is established, and a server finished message is sent in 112. The handshake protocol hence comprises 106-112, whereas the record protocol phase comprises 114 in which application data is sent by using the established security context.

FIGS. 2A and 2B illustrate protocol relationships between different transport layer protocols and application layer protocols. The HTTP application protocol 202 uses the TLS protocol 204, which uses transmission control protocol (TCP) 206. FIG. 2B illustrates that CoAP 208 uses the DTLS protocol 210, which uses the UDP protocol 212 in the transport layer.

The server 104 of FIG. 1, can be CoAP/DTLS server. Verification of integrity of alleged clients takes place in the third message pass 110, "Client Finished Message" of the handshake protocol. A client pretending to be a legitimate client will be detected in this step and the protocol is aborted.

To minimize processing for constrained devices, pre-shared keys (PSKs) may be deployed as initial key material to bootstrap the security of DTLS.

For very constrained resource devices, such as a microcontroller with 8 bit/16 MHz processor with 8-16 kB of Random Access Memory (RAM), the DTLS pre-shared key handshake could still take the order of seconds to complete in processing only, and significantly more if wireless communication is assumed. It is noted that the DTLS protocol is not designed with constrained devices in mind.

Now, in current CoAP there is no difference between authentication and authorization. Constrained resource devices are typically provided with "access control lists" of trusted clients which the constrained resource device can start DTLS sessions with.

However, restricting access to pre-provisioned trusted users is not flexible.

There is hence a need for alternative security mechanisms for key provisioning, authentication and authorization.

SUMMARY

It is an object of embodiments of the invention to address at least some of the issues outlined above, and this object and others are achieved by a constrained resource device, an authorization server, and the method for establishing a secret key shared between the constrained resource device and a client node, and a method for enabling establishment of the secret key shared between the constrained resource device and the client device, according to the appended independent claims, and by the embodiments according to the dependent claims.

According to a first aspect, the invention provides a method for enabling establishment of a secret first key that is shared between a constrained RD and a client device. The method is performed in an AS having a secret second key shared with the constrained RD, and where the AS is associated with the client device. The method comprises receiving from the client device a request for a secret first key shared between the constrained RD and the client device. The method also comprises determining an identifier of the request, based on the request received from the client device, and generating the secret first key based on said identifier of the request and the secret second key, wherein the secret first key is associated with the identifier of the request. In addition, the method comprises sending to the client device the identifier of the request and the generated secret first key, thereby enabling the client device to generate a digital signature to be used in communication with the constrained RD, enabling the establishment of the secret first key shared between the constrained RD and the client device.

According to a second aspect, the invention provides an authorization server (AS) being configured to enable establishment of a secret first key shared between a constrained resource device (RD) and a client device. The AS is configured to have a secret second key shared with the constrained RD and to be associated with the client device. The AS comprises a processor and a memory that stores a computer program comprising computer program code which when run in the processor, causes the authorization server to receive from the client device a request for a secret first key shared between the constrained RD and the client device. It also causes the authorization to determine an identifier of the request, based on the request received from the client device, and to generate the secret first key based on the identifier of the request and the secret second key, wherein the secret first key is associated with the identifier of the request. In addition, it causes the authorization server to send to the client device the identifier of the request and the generated secret first key, enabling the client device to generate a digital signature, to be used in communication with the constrained RD, enabling the establishment of the secret first key shared between the constrained RD and the client device client device.

According to a third aspect, the invention provides an authorization server (AS) being configured to enable establishment of a secret first key shared between a constrained resource device (RD) and a client device. The AS is configured to have a secret second key shared with the constrained RD and to be associated with the client device. The AS comprises a receiving unit that is configured to receive from the client device a request for a secret first key shared between the constrained RD and the client device. The AS also comprises a determining unit that is configured to determine an identifier of the request, based on the request received from the client device. The AS also comprises a generating unit that is configured to generate the secret first key based on the identifier of the request and the secret second key, wherein the secret first key is associated with the identifier of the request. In addition, the AS comprises a sending unit that is configured to send to the client device the identifier of the request and the generated secret first key, enabling the client device to generate a digital signature, to be used in communication with the constrained RD, enabling the establishment of the secret first key shared between the constrained RD and the client device.

According to a fourth aspect, the invention provides a method for establishing of a secret first key shared between a client device and a constrained RD. The constrained RD has a secret second key shared with an authorization server, AS. The method is performed in the constrained RD, and wherein the AS is associated with the client device. The method comprises receiving from the client device, a digital signature and an identifier of a request for the secret first key. The method also comprises deriving a secret first key based on the identifier of the request and the secret second key, and generating a digital signature based on the derived secret first key. The method further comprises determining whether the received digital signature equals to the generated digital signature. In addition, the method also comprises, if the received digital signature equals to the generated digital signature, deducing that derived secret first key equals to a secret first key of the AS, and that the received identifier of the request equals to an identifier of the request as determined by the AS.

According to a fifth aspect, the invention provides a constrained resource RD, that is configured to establish a secret first key shared between a client device and the constrained resource device, RD. The constrained RD is configured to have a secret second key shared with an authorization server, AS and where the AS is associated with the client device. The constrained RD comprises a processor and a memory that stores a computer program comprising computer program code which when run in the processor, causes the constrained resource device to receive, from the client device, a digital signature and an identifier of a request for the secret first key. It also causes the constrained RD to derive a secret first key based on the identifier of the request and the secret second key, and to generate a digital signature based on the derived secret first key. In addition, it causes the constrained RD to determine whether the received digital signature equals to the generated digital signature. In addition, the computer program code which when run in the processor, causes the constrained RD to, if the received digital signature equals to the generated digital signature, deduce that the derived secret first key equals to a secret first key of the AS, and that the received identifier of the request equals to an identifier of the request as determined by the AS.

According to sixth aspect, the invention provides a constrained resource RD that is configured to establish a secret first key shared between a client device and the constrained resource device, RD. The constrained RD is configured to have a secret second key shared with an authorization server, AS and where the AS is associated with the client device. The constrained RD comprises a receiving unit that is configured to receive from the client device a digital signature and an identifier of a request for the secret first key. Also, the constrained RD comprises a deriving unit that is configured to derive a secret first key based on the identifier of the request and the secret second key. Further, the constrained RD comprises a generating unit that is configured to generate a digital signature based on the derived secret first key. In addition, the constrained RD comprises a determining unit that is configured to determine whether the received digital signature equals to the generated digital signature. The generating unit is further configured to, if the received digital signature equals to the generated digital signature, deduce that the derived secret first key equals to a secret first key of the AS, and that the received identifier of the request equals to an identifier of the request as determined by the AS.

It is an advantage with embodiments of the invention that no additional messages need to be sent or received by a constrained resource device, to be able to update an access control list.

A further advantage with embodiments of the invention is that a flexible access control model can be adopted with minor cost and only in terms of processing by the constrained RD.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

As mentioned above, restricting access to pre-provisioned trusted users is not flexible, since any client or user would have to be pre-provisioned in the constrained resource device in order to access the constrained resource device. This is indeed a drawback.

In order not to restrict to pre-provisioned trusted clients, a Trusted Third Party (TTP) is introduced in granting access for new clients without re-provisioning of the constrained resource device. The TTP, representing the owner of the device, naturally has a trust relationship with the constrained resource device. This trust relationship may be documented in the form of a shared key or exchanged authentic public keys.

The established trust relationship between constrained resource device and the TTP, can be used to grant access for new clients, in a more flexible mechanism.

However, the configuration of non-preconfigured clients will add a number of additional message exchanges and device processing to establish an identifier/key of new authorized clients in the access control list of the constrained resource device. This could lead to prolonged setup times and increased energy consumption.

There is hence also a need to minimize the number of message exchanges and processing by the constrained resource device to establish an identifier of a trusted client device.

By integrating an access control list update into an authentication protocol, and by using a secret key based on a secret key shared between the constrained RD and an authorization server (AS), no additional messages need to be sent in the authentication protocol.

Based on a secret key shared between the constrained RD and the AS, the constrained RD can derive a secret key shared between the client device and the constrained RD, based on information carried on handshake protocol messages.

An access control list of the constrained RD is thus updated during the authentication protocol.

The constrained RD will be able to communicate with an arbitrary client device, provided that the constrained RD has a secret key shared with the AS, and that the AS is associated with the client device.

Thus, an AS and a constrained RD shares a key K. The constrained RD and the client device do not share a key; they may even be unaware of each other.

In order to illustrate embodiments of the invention, FIG. 5 will now be discussed.

Figure 5:
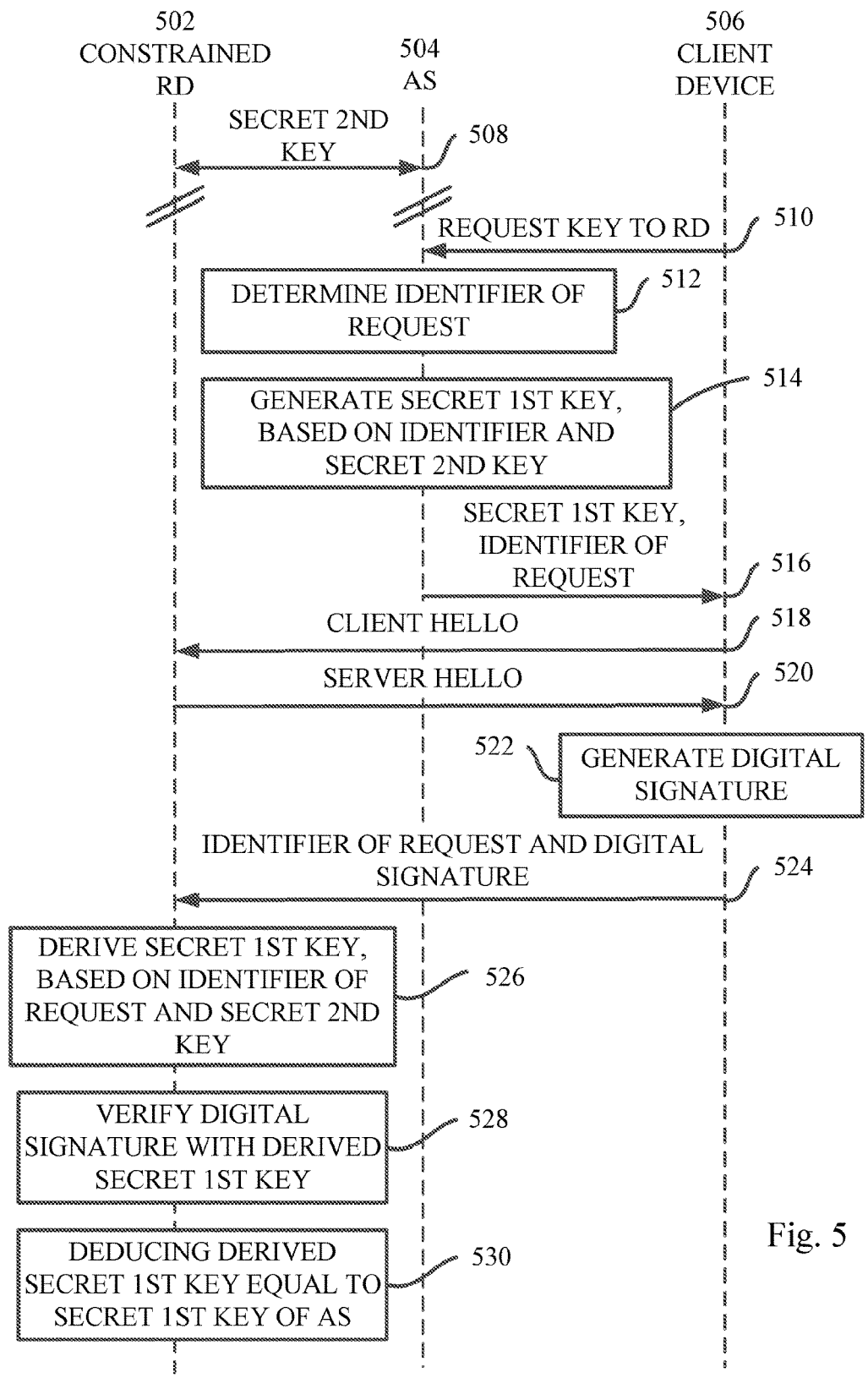
FIG. 5 presents a signalling diagram of embodiments of the invention.

FIG. 5 presents a signaling diagram of signaling between a constrained RD 502, an AS 504 and a client device 506, for establishing a secret first key shared between the client device and the constrained RD 502. The AS is associated with the client device. The constrained RD, the AS and the client device may belong to the same or different communication networks. In 508, the constrained RD and the AS shares a secret second key. This secret second key may be installed when manufacturing the constrained RD 502 and the AS 504. Typically, it is shared prior to continuing to 510 and on.

In 510, the client device sends a request for a key to the constrained, where the request is sent to the AS 504. This request may comprise a client device identifier.

In 512, the AS 504 determines an identifier of the request. This identifier of the request may be determined based on the client device identifier.

The identifier of the request may comprise a nonce. If the identifier of the request is used as an integrity protected channel for encrypted data between the AS and the constrained RD, the data will look random and may therefore be used as a nonce. If the identifier of the request is used as a channel for transporting random data, without any intrinsic meaning, the random data can also be used as a nonce.

In 514, the AS 504 generates the secret first key, based on the determined identifier of the request and the secret second key RD.

In 516, the AS sends the generated secret first key and the determined identifier of the request to the client device 506. For this purpose the AS typically uses a secure or encrypted connection to the client device 506.

In 518, the client device sends a "client hello" message to the constrained RD 502, as a message of a 4-pass handshake protocol, such as DTLS protocol.

In 520 the constrained RD 502 replies to the client device 506 in a "server hello" message, being another message of the 4-pass handshake protocol.

In 522, the client device 506 generates a digital signature based on the secret first key as received in 516. This digital signature may be a message authentication code (MAC).

In 524, the client device 506 sends the digital signature and the identifier of the request, as received from the AS in 516, to the constrained RD 502. The digital signature and the identifier of the request may be sent in a "client finished" message to the constrained RD 502. Alternatively, they can be sent in different messages, for instance, the identifier of the request sent in the "client hello" message, as of 518 above, and the digital signature sent in the "client finished" message, as of 524.

The identifier of the request may be embedded in various message fields. One option to embed the identifier of the request is to re-use existing TLS or DTLS message fields, such as, "random" or "session identity (ID)" fields of the "client hello", or "pre-shared key (psk)-identity" of "client key exchange". Another option is the use of TLS Extensions, whereby custom data structures can be defined and sent with TLS. One kind of TLS Extension may comprise the identifier of the request and optionally, an identifier of the authorization server or the secret key used by the authorization server for the derivation of the secret first key shared between client device and the RD.

Another use of TLS Extension is to embed the identifier of the request in an authorization assertion carried as "supplemental data" in a TLS Authorization Extension.

In 526, the constrained RD 502 derives the secret first key, based on the received identifier of the request and the secret second key, shared with the AS 504.

In 528, the constrained RD 502 verifies a digital signature with the derived secret first key. This may be performed by generating 406 the digital signature based on the derived secret first key, and determining 408 whether the generated digital signature equals to the received digital signature, as received in 524. If the digital signature is verified in 528, or alternatively, if it is determined that the generated digital signature equals to the received digital signature, the constrained RD 502 deduces that the derived secret first key equals to the secret first key as generated by the AS. The constrained RD 502 may also deduce that the identifier of the request as received in 524 equals to the identifier of the request as determined in 512 by the AS 504. A secret key has been established between the constrained RD 502 and the client device 506, according to the request of the client device in 510. This secret key can thus also be established during an authentication protocol, such as TLS or DTLS. Other 4-pass authentication protocols may alternatively be used, for instance Internet Key Exchange (IKE), during which the secret key is established between a constrained RD and a client device.

If the digital signature can not be verified, or alternatively if it determined that the generated digital signature is not equal to the received digital signature, no secret key can thus be established between the constrained RD 502 and the client device 506, and no further operation is performed.

Figure 1:
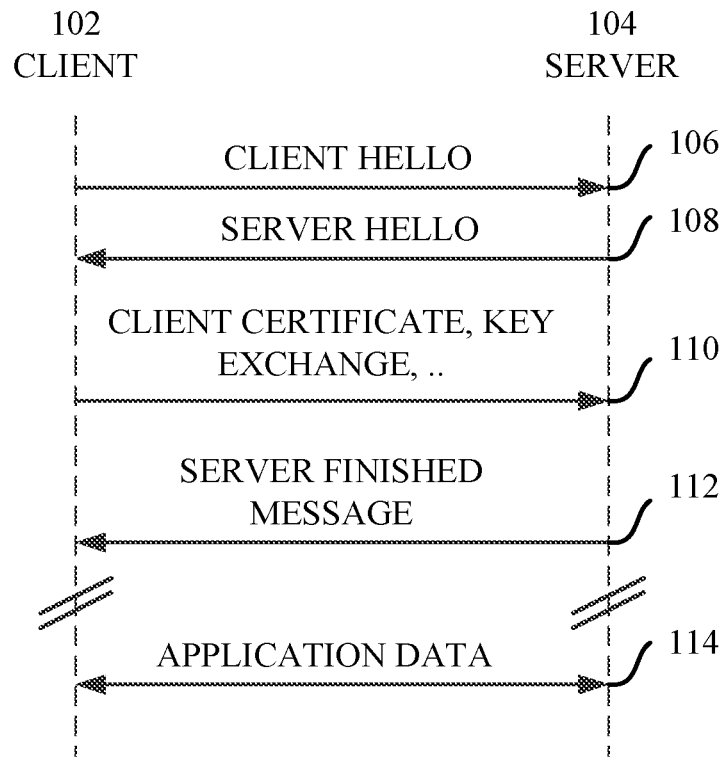
FIG. 1 presents a signalling diagram for a client-server relation, according to the prior art.
Figure 2A:
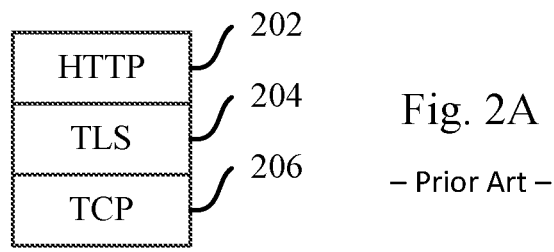
FIGS. 2A and 2B, schematically present known protocol architectures.
Figure 2B:
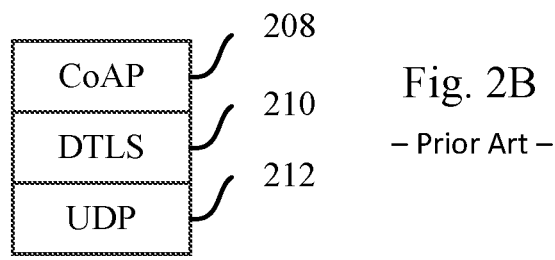
Figure 3:
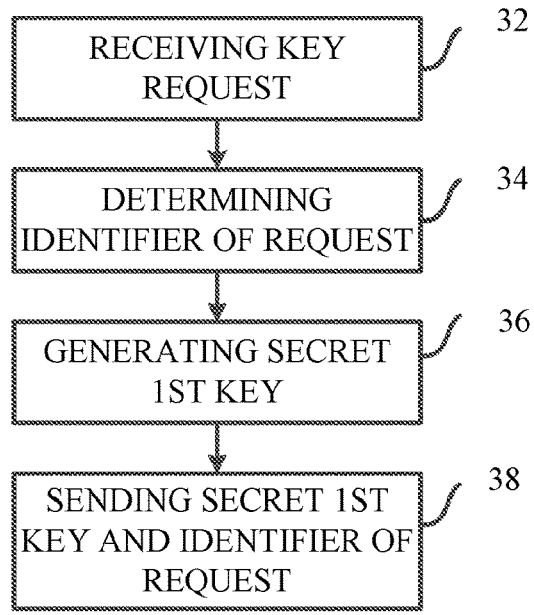
FIGS. 3 and 4 present flow diagrams of methods according to embodiments of the invention.

With reference to FIG. 3 a flow chart of a method for enabling establishment of a secret first key shared between a constrained RD and a client device, according to embodiments of the invention, will now be described. The method is performed in an AS having a secret second key shared with the constrained RD, and where the AS is associated with the client device. The method comprises receiving 32 from the client device a request for a secret first key shared between the constrained RD and the client device. The method also comprises determining 34 an identifier of the request, based on the request received from the client device, and generating 36 the secret first key based on said identifier of the request and the secret second key, wherein the secret first key is associated with the identifier of the request. In addition, the method comprises sending 38 to the client device the identifier of the request and the generated secret first key, thereby enabling the client device to generate a digital signature to be used in communication with the constrained RD, enabling the establishment of the secret first key shared between the constrained RD and the client device.

The request for the secret first key may comprise a client device identifier, and the method may further comprise authenticating the client device based on the client device identifier.

The determining of the identifier of the request may further be based on the client device identifier.

Also, the identifier of the request may comprise the client device identifier, further enabling the constrained RD to authenticate the client device.

The identifier of the request may comprise access information for the client device, further enabling the constrained RD to authorize access to the constrained RD for the client device.

The identifier of the request within the method for enabling establishment of a secret first key, may comprise a nonce. If the identifier of the request is used as an integrity protected channel for encrypted data between the AS and the constrained RD, the data will look random and may therefore be used as a nonce. If the identifier of the request is used as a channel for transporting random data, without any intrinsic meaning, the random data can be used as a nonce.

The method for enabling establishment of a secret first key may be performed within an authentication protocol.

The authentication protocol in which the method for enabling establishment of a secret first key is performed, may comprise the transport layer security (TLS) protocol or the datagram transport layer security (DTLS) protocol.

Figure 4:
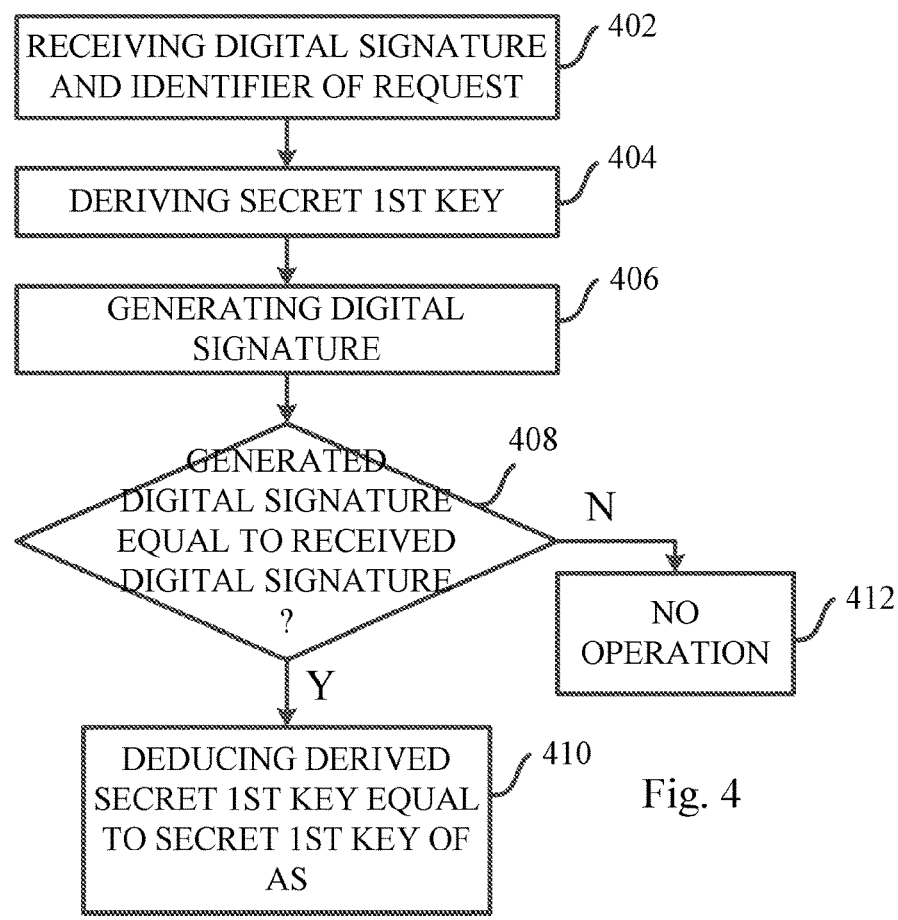

With reference to FIG. 4 a flow chart of a method for establishing of a secret first key shared between a client device and a constrained RD, according to embodiments of the invention, is described. The constrained RD has a secret second key shared with an AS. The method is performed in the constrained RD, and wherein the AS is associated with the client device. The method comprises receiving 402 from the client device, a digital signature and an identifier of a request for the secret first key. The method also comprises deriving 404 a secret first key based on the identifier of the request and the secret second key, and generating 406 a digital signature based on the derived secret first key. The method further comprises determining 408 whether the received digital signature equals to the generated digital signature. In addition, the method also comprises, if the received digital signature equals to the generated digital signature, deducing that derived secret first key equals to a secret first key of the AS, and that the received identifier of the request equals to an identifier of the request as determined by the AS. If the received digital signature is not equal to the generated digital signature, the method comprises performing 412 no operation.

The identifier of the request within the method for establishing a secret first key, may comprise a nonce.

The identifier of the request, within the method for establishing a secret first key, may comprise a client device identifier, based on which the client device may be authenticated.

The identifier of the request within the method for establishing a secret first key, may comprise access information for client device, based on which the method may further comprise authorizing the client device access to the constrained RD.

The method for establishing a secret first key may comprise generating a second digital signature based on the derived secret first key, and sending the second digital signature to the client device.

The method for establishing a secret first key, wherein a digital signature may comprise a message authentication code (MAC).

The method for establishing a secret first key may be performed within an authentication protocol.

The authentication protocol in which the method for establishing a secret first key is performed, may comprise a transport layer security (TLS) protocol or a datagram transport layer security (DTLS) protocol.

Figure 6:
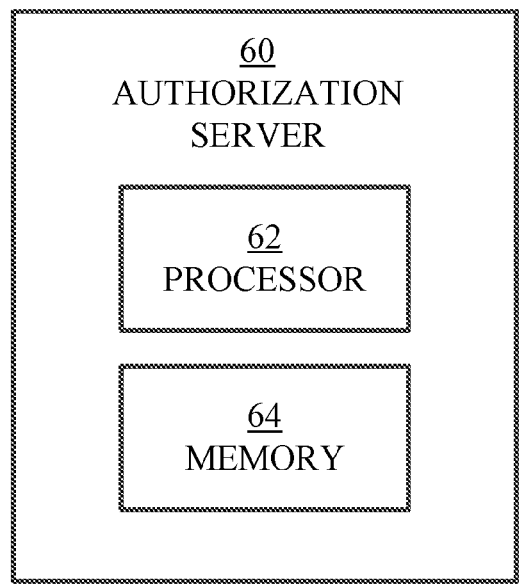
FIGS. 6 and 8 schematically present an authorization server according to embodiments of the invention.

With reference to FIG. 6, an authorization server 504, 60 for enabling establishment of a secret first key shared between a constrained RD 502 and a client device 506, is schematically presented. The authorization server 504, 60 is configured to enable establishment of a secret first key that is shared between a constrained RD 502 and a client device 506. The AS is configured to have a secret second key shared with the constrained RD and to be associated with the client device. The AS comprises a processor 62 and a memory 64 that stores a computer program comprising computer program code which when run in the processor, causes the authorization server to receive 32, 510 from the client device a request for a secret first key shared between the constrained RD and the client device. It also causes the authorization to determine 34, 512 an identifier of the request, based on the request received from the client device, and to generate 36, 514 the secret first key based on the identifier of the request and the secret second key, wherein the secret first key is associated with the identifier of the request. In addition, it causes the authorization server to send 38, 516 to the client device the identifier of the request and the generated secret first key, enabling the client device to generate a digital signature, to be used in communication with the constrained RD, enabling the establishment of the secret first key shared between the constrained RD and the client device client device.

The computer program code of the memory within the authorization server, wherein the code when run in the processor, may cause the authorization server to receive a client device identifier in the request for the secret first key, and to authenticate the client device 506 based on the received client device identifier.

The computer program code of the memory within the authorization server, wherein the code when run in the processor, causes the authorization server to determine an identifier of the request, wherein the identifier of the request may comprise a nonce.

The identifier of the request can be used as an integrity protected channel for encrypted data between the AS and the constrained RD. Since the encrypted data will seem random, the encrypted data can be used as a nonce. If the identifier of the request is used as a channel for transporting random data, without any intrinsic meaning, the random data as such can be used as a nonce.

Figure 7:
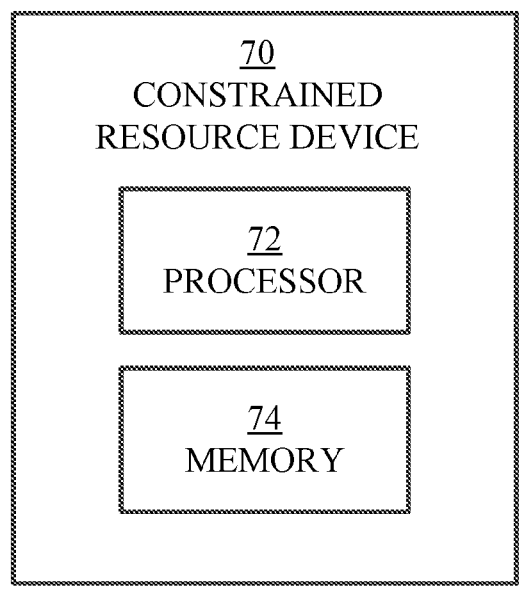
FIGS. 7 and 9 schematically present a constrained resource device according to embodiments of the invention.

FIG. 7 schematically presents a constrained RD 502, 70 being configured to establish a secret first key shared between a client device 506 and the constrained RD 502, 70. The constrained RD is configured to have a secret second key shared with an AS 504, 60 and where the AS is associated with the client device 506. The constrained RD comprises a processor 72 and a memory 74 that stores a computer program comprising computer program code which when run in the processor, causes the constrained resource device to receive 402, 524, from the client device, a digital signature and an identifier of a request for the secret first key. It also causes the constrained RD to derive 404, 526 a secret first key based on the identifier of the request and the secret second key, and to generate 406, 528 a digital signature based on the derived secret first key. In addition, it causes the constrained RD to determine 408, 528 whether the received digital signature equals to the generated digital signature. In addition, the computer program code which when run in the processor, causes the constrained RD to, if the received digital signature equals to the generated digital signature, deduce that the derived secret first key equals to a secret first key of the AS, and that the received identifier of the request equals to the identifier of the request as determined by the AS.

The computer program code of the constrained RD, wherein the code when run in the processor, may cause the constrained resource device to, when the identifier of the request comprises access information for client device, authorize the client device access to the constrained RD, based on the access information.

The computer program code of the constrained RD, wherein the code when run in the processor, may cause the constrained resource device to receive the identifier of the request comprising a nonce.

The computer program code of the constrained RD, wherein the code which when run in the processor, may cause the constrained resource device to generate a second digital signature based on the derived secret first key, and to send the second digital signature to the client device.

The constrained resource device may comprise a constrained resource server.

Figure 8:
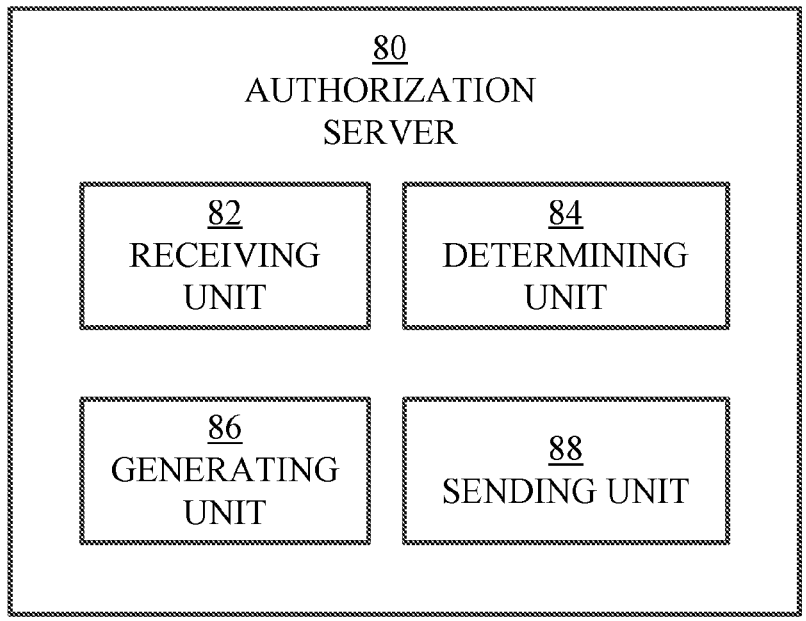

FIG. 8 schematically presents an authorization server (AS) 80 that is configured to enable establishment of a secret first key shared between a constrained RD and a client device. The AS is configured to have a secret second key shared with the constrained RD and to be associated with the client device. The AS 80 comprises a receiving unit 82 that is configured to receive 32, 510 from the client device a request for a secret first key shared between the constrained RD and the client device. The AS also comprises a determining unit 84 that is configured to determine 34, 512 an identifier of the request, based on the request received from the client device. The AS further comprises a generating unit 86 that is configured to generate 36, 514 the secret first key based on the identifier of the request and the secret second key, wherein the secret first key is associated with the identifier of the request. In addition, the AS also comprises a sending unit 88 that is configured to send 38, 516 to the client device the identifier of the request and the generated secret first key, enabling the client device to generate a digital signature, to be used in communication with the constrained RD, enabling the establishment of the secret first key shared between the constrained RD and the client device.

Figure 9:
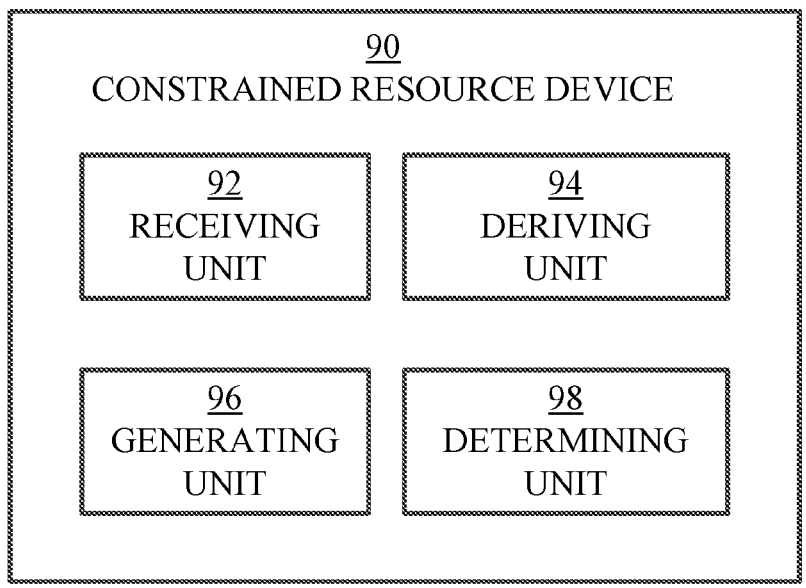

FIG. 9 schematically presents a constrained RD 502, 90 that is configured to establish a secret first key shared between a client device 506 and the constrained RD 502, 90, the constrained RD being configured to have a secret second key shared with an AS 504, 60, 80, and where the AS is associated with the client device. The constrained RD comprises a receiving unit 92 that is configured to receive from the client device a digital signature and an identifier of a request for the secret first key. Also, the constrained RD comprises a deriving unit 94 that is configured to derive a secret first key based on the identifier of the request and the secret second key. Further, the constrained RD comprises a generating unit 96 that is configured to generate a digital signature based on the derived secret first key. In addition, the constrained RD comprises a determining unit 98 that is configured to determine whether the received digital signature equals to the generated digital signature. The generating unit 96 is further configured to, if the received digital signature equals to the generated digital signature, deduce that the derived secret first key equals to a secret first key of the AS, and that the received identifier of the request equals to an identifier of the request as determined by the AS.

The disclosure thus presents an authorization server, a constrained resource device, and methods thereof.

The present invention has the following advantages:
No additional messages need to be sent or received by a constrained resource device, to be able to update an access control list. A more flexible access control model can thus be adopted with minor cost and only in terms of processing by the constrained RD.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

AS Authorization Server
CoAP Constrained Application Protocol
DTLS Datagram TLS
HTTP Hypertext Transfer Protocol
ID Identity
IETF Internet Engineering Task Force
IKE Internet Key Exchange
IoT Internet of Things
PSK Pre-shared key
RAM Random Access Memory
RD Resource Device
TCP Transmission Control Protocol
TLS Transport Layer Security
TTP Trusted Third Party
UDP User Datagram Protocol

The invention claimed is:

1. A method, the method comprising:
   receiving, by an authorization server, from a client device a request for a secret first key;
   determining, by the authorization server, an identifier of the request based on information included in the request;
   generating, by the authorization server, the secret first key based on said identifier of the request and a secret second key, wherein the secret first key is associated with the identifier of the request and the secret second key is known to a constrained resource device (RD); and
   sending to the client device the identifier of the request and the generated secret first key, wherein
   the client device is configured to transmit to the constrained RD a client hello message of a 4-pass authentication protocol, wherein the client device is configured to transmit said client hello message after receiving the identifier of the request and the generated secret first key,
   the client device is configured to: (i) generate a first digital signature using the secret first key in response to receiving a server hello message transmitted by the constrained RD in response to the client hello message transmitted by the client device and (ii) transmit to the constrained RD a client finished message of the 4-pass authentication protocol, wherein the client finished message includes the first digital signature and the identifier of the request, and
   the constrained RD is configured to: (i) derive the secret first key based on the identifier of the request and the secret second key shared with the authorization server, (ii) generate a second digital signature using the derived secret first key, (iii) determine whether the generated second digital signature matches the received first digital signature, and (iv) as a result of determining that the generated second digital signature matches the received first digital signature, determine that the derived secret first key is the same as the secret first key generated by the authorization server.

2. The method for enabling establishment of a secret first key according to claim 1, wherein the request for the secret first key comprises a client device identifier, the method further comprising authenticating the client device based on the client device identifier.

3. The method for enabling establishment of a secret first key according to claim 2, wherein determining the identifier of the request, further is based on the client device identifier.

4. The method for enabling establishment of a secret first key according to claim 2, wherein the identifier of the request comprises the client device identifier, further enabling the constrained RD to authenticate the client device.

5. The method for enabling establishment of a secret first key according to claim 2, wherein the identifier of the request comprises access information for the client device, further enabling the constrained RD to authorize access to the constrained RD for the client device.

6. The method for enabling establishment of a secret first key according to claim 1, wherein the identifier of the request comprises a nonce.

7. The method for enabling establishment of a secret first key according to claim 1, wherein the 4-pass authentication protocol is one of: a) the Transport Layer Security (TLS) protocol and b) Datagram Transport Layer Security (DTLS) protocol.

8. A method performed in a constrained resource device (RD), the method comprising:
   receiving a client hello message transmitted by a client device, wherein the client hello message is the first message of a 4-pass authentication protocol;
   in response to receiving the client hello message transmitted by the client device, transmitting to the client device a server hello message, wherein the server hello message is the second message of the 4-pass authentication protocol and the client device is configured to transmit to the constrained RD a client finished message after receiving the server hello message, wherein the client finished message is a message of the 4-pass authentication protocol and the client finished message comprises: i) a digital signature generated by the client device using a secret first key and ii) an identifier;
   receiving the client finished message transmitted by the client device;
   deriving the secret first key based on the identifier and a secret second key, wherein the secret second key is shared between the constrained RD and an authorization server (AS), and wherein the AS is associated with the client device;
   generating a digital signature based on the derived secret first key;
   determining whether the digital signature included in the client finished message matches the generated digital signature; and
   as a result of determining that the digital signature included in the client finished message matches the generated digital signature, determining that the derived secret first key is the same as the secret first key used by the client device.

9. The method for establishing a secret first key according to claim 8, wherein the identifier of the request comprises a nonce.

10. The method for establishing a secret first key according to claim 8, wherein the identifier of the request comprises a client device identifier, the method further comprising authenticating the client device based on the client device identifier.

11. The method for establishing a secret first key according to claim 8, wherein the identifier of the request comprises access information for client device, the method further comprising authorizing the client device access to the constrained RD, based on the access information.

12. The method for establishing a secret first key, according to claim 8, further comprising generating a second digital signature based on the derived secret first key, and sending the second digital signature to the client device.

13. The method for establishing a secret first key according to claim 8, wherein a digital signature comprises a message authentication code, MAC.

14. The method for establishing a secret first key according to claim 8, wherein the authentication protocol comprises a transport layer security, TLS, protocol or a datagram transport layer security, DTLS, protocol.

15. A constrained resource device (RD) comprising:
a processor; and
a memory storing a computer program comprising computer program code which when run in the processor, causes the constrained resource device to:
receive a client hello message transmitted by a client device, wherein the client hello message is the first message of a 4-pass authentication protocol;
in response to receiving the client hello message transmitted by the client device, transmit to the client device a server hello message, wherein the server hello message is the second message of the 4-pass authentication protocol and the client device is configured to transmit to the constrained RD a client finished message after receiving the server hello message, wherein the client finished message is a message of the 4-pass authentication protocol and the client finished message comprises: i) a digital signature generated by the client device using a secret first key and ii) an identifier;
receive the client finished message transmitted by the client device, wherein the client finished message is a message of the 4-pass authentication protocol and the client finished message comprises a digital signature and an identifier;
derive the secret first key based on the identifier and a secret second key, wherein the secret second key is shared between the constrained RD and an authorization server (AS), and wherein the AS is associated with the client device;
generate a digital signature based on the derived secret first key;
determine whether the digital signature included in the client finished message matches the generated digital signature; and
as a result of determining that the digital signature included in the client finished message matches the generated digital signature, determine that the derived secret first key is the same as the secret first key used by the client device.

16. The constrained resource device, RD, according to claim 15, wherein the computer program code which when run in the processor, causes the constrained resource device to, when the identifier of the request comprises a client device identifier, authenticate the client device based on the client device identifier.

17. The constrained resource device, RD, according to claim 15, wherein the computer program code which when run in the processor, causes the constrained resource device to, when the identifier of the request comprises access information for client device, authorize the client device access to the constrained RD, based on the access information.

18. The constrained resource device, RD, according to claim 15, wherein the computer program code which when run in the processor, causes the constrained resource device to receive the identifier of the request comprising a nonce.

19. The constrained resource device, RD, according to claim 15, wherein the computer program code which when run in the processor, causes the constrained resource device to generate a second digital signature based on the derived secret first key, and to send the second digital signature to the client device.

20. The constrained resource device, RD, according to claim 15, comprising a constrained resource server.

* * * * *